(12) United States Patent
Jin et al.

(10) Patent No.: US 7,363,281 B2
(45) Date of Patent: Apr. 22, 2008

(54) REDUCTION OF FITNESS EVALUATIONS USING CLUSTERING TECHNIQUES AND NEURAL NETWORK ENSEMBLES

(75) Inventors: Yaochu Jin, Rodgau (DE); Bernhard Sendhoff, Bruchköbel (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 113 days.

(21) Appl. No.: 11/042,991

(22) Filed: Jan. 24, 2005

(65) Prior Publication Data

US 2005/0209982 A1 Sep. 22, 2005

(30) Foreign Application Priority Data

Jan. 26, 2004 (EP) .................................. 04001615
Apr. 29, 2004 (EP) .................................. 04010194

(51) Int. Cl.
*G06F 15/18* (2006.01)
*G06F 5/00* (2006.01)

(52) U.S. Cl. .............................. 706/13; 706/12; 706/19
(58) Field of Classification Search .................. 706/15
See application file for complete search history.

(56) References Cited

U.S. PATENT DOCUMENTS

| | | | | |
|---|---|---|---|---|
| 5,074,752 | A | * | 12/1991 | Murphy et al. ........... 415/209.4 |
| 5,136,686 | A | * | 8/1992 | Koza ........................... 706/13 |
| 5,148,513 | A | | 9/1992 | Koza et al. |
| 5,265,830 | A | | 11/1993 | Allen |
| 5,319,781 | A | | 6/1994 | Syswerda |
| 5,355,528 | A | | 10/1994 | Roska et al. |
| 5,461,570 | A | | 10/1995 | Wang et al. |
| 5,487,130 | A | * | 1/1996 | Ichimori et al. ............... 706/61 |
| 5,541,848 | A | | 7/1996 | McCormack et al. |
| 5,724,258 | A | | 3/1998 | Roffman |
| 5,819,244 | A | | 10/1998 | Smith |
| 5,924,048 | A | | 7/1999 | McCormack et al. |
| 6,285,968 | B1 | * | 9/2001 | Motoyama et al. ............ 703/1 |
| 6,292,763 | B1 | * | 9/2001 | Dunbar et al. ................ 703/7 |
| 6,449,603 | B1 | * | 9/2002 | Hunter ........................ 706/15 |

(Continued)

OTHER PUBLICATIONS

Ll, Ming et al., "Hybrid Evolutionary Search Method Based on Clusters." Aug. 2001, IEEE Transactions on Pattern Analysis and Machine Intelligence, vol. 23, pp. 786-799.*

(Continued)

*Primary Examiner*—David Vincent
*Assistant Examiner*—Melissa J Berman
(74) *Attorney, Agent, or Firm*—Fenwick & West LLP

(57) ABSTRACT

The invention relates to an evolutionary optimization method. First, an initial population of individuals is set up and an original fitness function is applied. Then the offspring individuals having a high evaluated quality value as parents are selected. In a third step, the parents are reproduced to create a plurality of offspring individuals. The quality of the offspring individuals is evaluated selectively using an original fitness function or an approximate fitness function. Finally, the method returns to the selection step until a termination condition is met. The step of evaluating the quality of the offspring individuals includes grouping all offspring individuals in clusters, selecting for each cluster one or a plurality of offspring individuals, resulting in altogether selected offspring individuals, evaluating the selected offspring individuals by the original fitness function, and evaluating the remaining offspring individuals by means of the approximate fitness function.

9 Claims, 12 Drawing Sheets

Evolutionary optimization algorithm

U.S. PATENT DOCUMENTS

| | | | |
|---|---|---|---|
| 6,516,309 B1* | 2/2003 | Eberhart et al. | 706/27 |
| 6,549,233 B1* | 4/2003 | Martin | 348/273 |
| 6,578,018 B1 | 6/2003 | Ulyanov | |
| 6,606,612 B1 | 8/2003 | Rai et al. | |
| 6,654,710 B1* | 11/2003 | Keller | 703/9 |
| 6,662,167 B1 | 12/2003 | Xiao | |
| 6,928,434 B1* | 8/2005 | Choi et al. | 707/6 |
| 6,950,712 B2* | 9/2005 | Ulyanov et al. | 700/28 |
| 7,043,462 B2* | 5/2006 | Jin et al. | 706/13 |
| 7,047,169 B2* | 5/2006 | Pelikan et al. | 703/2 |
| 2002/0138457 A1 | 9/2002 | Jin et al. | |
| 2002/0165703 A1* | 11/2002 | Olhofer et al. | 703/22 |
| 2003/0030637 A1* | 2/2003 | Grinstein et al. | 345/420 |
| 2003/0055614 A1* | 3/2003 | Pelikan et al. | 703/2 |
| 2003/0065632 A1* | 4/2003 | Hubey | 706/15 |
| 2003/0191728 A1* | 10/2003 | Kulkami et al. | 706/21 |
| 2004/0014041 A1* | 1/2004 | Allan | 435/6 |
| 2004/0030666 A1* | 2/2004 | Marra et al. | 706/48 |
| 2004/0034610 A1* | 2/2004 | De Lacharriere et al. | 706/20 |
| 2004/0049472 A1 | 3/2004 | Hayashi et al. | |
| 2005/0209982 A1* | 9/2005 | Jin et al. | 706/13 |
| 2005/0246297 A1* | 11/2005 | Chen et al. | 706/15 |

OTHER PUBLICATIONS

Hruschka, Eduardo et al., "Using a Clustering Genetic Algorithm for Rule Extraction from Artificial Neural Networks." 2000, IEEE, pp. 199-206.*

Liu, Fang et al., "Designing Neural Networks Ensembles Based on the Evolutionary Programming." Nov. 2-5, 2003, Proceedings of the Second International Conference on Machine Learning and Cybemetrics, Ei'an, IEEE, pp. 1463-1466.*

Zhou, Zhi-Hua et al., "Genetic Algorithm based Selective Neural Network Ensemble." 2001, Proceedings of the 17th International Joint Conference on Artificial Intelligenc, IEEE, vol. 2, pp. 797-802.*

Kim, Hee-Su et al., "An Efficient Genetic Algorithm with Less Fitness Evaluation by Clustering." 2001, IEEE, pp. 887-894.*

Kim et al "An Efficient Genetic Algorithm with Less Fitness Evaluation by Clustering". 2001, IEEE. pp 887-894.*

Zhou et al. "Genetic Algorithm based Selective Neural Network Ensemble". 2001, Proceedings of the 17th International Joint Conference on Artificial Intelligence, vol. 2 pp. 797-802.*

Branke, J. et al., "Faster Convergence By Means Of Fitness Estimation," Oct. 1, 2002, pp. 1-9, Karlsruhe, Germany.

El-Beltagy, M.A. et al., "Metamodeling Techniques For Evolutionary Optimization Of Computationally Expensive Problems: Promises And Limitations," Genetic Algorithms And Classifier Systems, pp. 196-203.

Emmerich, M. et al., "Metamodel—Assited Evolution Strategies," PPSN VII, LNCS, 2002, 99. 361-370, Springer Verlag, Berlin, Heidelberg.

Jain, A. K. et al., "Data Clustering: A Review," ACM Computing Surveys, Sep. 1999, pp. 264-323, vol. 31, No. 3.

Jimenez, D. et al., "Dynamically Weighted Ensemble Neural Networks For Classification," IEEE, 1998, pp. 753-756.

Jin, Y. et al., "Fitness Approximation In Evolutionary Computation—A Survey," 8 pages.

Jin, Y. et al., "A Framework For Evolutionary Optimization With Approximate Fitness Functions," IEEE Transactions On Evolutionary Computation, Oct. 2002, pp. 481-494, vol. 6, No. 5.

Jin, Y. et al., "On Evolutionary Optimization With Approximate Fitness Functions," 8 pages.

Kim, H.S. et al., "An Efficient Genetic Algorithm With Less Fitness Evaluation By Clustering," IEEE, 8 pages.

Liu, Y. et al., "Negatively Correlated Neural Networks Can Produce Best Ensembles," Australian Journal Of Intelligent Information Processing Systems, Spring/Summer 1997, pp. 176-185.

Liu, Y. et al., "Evolutionary Ensembles With Negative Correlation Learning,"pp. 1-27.

Liu, Y. et al., "Simultaneous Training Of Negatively Correlated Neural Networks In An Ensemble," IEEE.

Optiz, D. et al., "Generating Accurate And Diverse Members Of A Neural-Network Ensemble," Advances In Neural Information Processing Systems 8, 7 pages, MIT Press, Cambridge, MA.

Perrone, M. et al., "When Networks Disagree: Ensemble Methods For Hybrid Neural Networks," Oct. 27, 1992, 15 pages.

Ratle, A., "Accelerating The Convergence Of Evolutionary Algorithms By Fitness Landscape Approximation," pp. 87-96.

Rosen, B., "Ensemble Learning Using Decorrelated Neural Networks," To Appear In Connections Science, pp. 1-14.

Rousseeuw, P., "Silhouettes: A Graphical Aid To The Interpretation And Validation Of Cluster Analysis," Journal Of Computational And Applied Mathematics, 1987, pp. 53-65, vol. 20.

Ulmer, H. et al., "Model-Assisted Steady-State Evolution Strategies," 12 pages, Center For Bioinformatics Tübingen (ZBIT), University of Tübingen, Germany.

Yao, X. et al., "Making Use Of Population Information in Evolutionary Artificial Neural Networks," IEEE Transactions On Systems, Man, And Cybemetics, Jun. 1998, pp. 417-425, vol. 28, No. 3.

Zhang, B. et al., "Building Optimal Committees Of Genetic Programs," pp. 1-10, Artificial Intelligence Lab (SCAI) School Of Computer Science And Engineering, Seoul National University, Korea.

European Search Report, EP 04010194, Jun. 7, 2006, 3 pages.

Kim, H-S. et al., "An Efficient Genetic Algorithm with Less Fitness Evaluation by Clustering," Proceedings of the 2001 Congress on Evolutionary Computation, IEEE, May 27-30, 2001, pp. 887-894.

Baluja, S. et al., "Combining Multiple Optimization Runs With Optimal Dependency Trees," June 30, 1997, 12 pages, CMU-CS-97-157, Justsystem Pittsburgh Research Center, Pittsburgh, PA and School Of Computer Science, Camegie Mellon University, Pittsburgh, PA.

Baluja, S., "Population-Based Incremental Learning: A Method For Integrating Genetic Search Based Function Optimization And Competitive Learning," Population Based Incremental Learning, Jun. 2, 1994, pp. 1-41, CMU-CS-94-163, School Of Computer Science, Camegie Mellon University, Pittsburgh, PA.

Bosman, P. et al., "Advancing Continuous IDEAs With Mixture Distributions And Factorization Selection Metrics," 6 pages, Institute Of Information And Computing Sciences, Utrecht University, Utrecht, The Netherlands.

Bosman, P. et al., "An Algorithmic Framework For Density Estimation Based Evolutionary Algorithms," Dec. 1999, pp. 1-63, Department Of Computer Science, Utrecht University, Utrecht, The Netherlands.

Bosman, P. et al., "Continuous Iterated Density Estimation Evolutionary Algorithms Within The IDEA Framework," 10 pages, Department Of Computer Science, Utrecht University, Utrecht, The Netherlands.

Bosman, P. et al., "IDEAs Based On The Normal Kemels Probability Density Function," Mar. 2000, pp. 1-16, Department Of Computer Science, Utrecht, The Netherlands.

Bosman, P. et al., "Mixed IDEAs," Dec. 2000, pp. 1-71, UU-CS-2000-45, Institute Of Information And Computing Sciences, Utrecht University, Utrecht, The Netherlands.

Bosman, P. et al., "Negative Log-Likelihood And Statistical Hypothesis Testing As The Basis Of Model Selection In IDEAs," Aug. 2000, pp. 1-17, Department Of Computer Science, Utrecht University, Utrecht, The Netherlands.

Deb, K. et al., "A Computatioanlly Efficient Evolutionary Algorithm For Real-Parameter Optimization," KanGAL Report No. 2002003, Apr. 11, 2002, pp. 1-21, Kanpur Genetic Algorithms Laboratory, (KanGAL), Indian Institute Of Technology Kanpur, Tsutsui Kanpur, India.

Deb, K. et al., "A Fast And Elitist Multi-Objective Genetic Algorithm: NSGA-II," KanGAL Report No. 200001, 20 pages, Kanpur Genetic Algorithms Laboratory (KanGAL), Indian Institute Of Technology Kanpur, Kanpur, India.

Deb, K, "A Population-Based Algorithm-Generator For Real-Parameter Optimization," KanGAL Report No. 2003003, 25 pages, Kanpur Genetic Algorithms Laboratory (KanGAL), Indian Institute Of Technology, Kanpur, Kanpur, India.

Deb, K. et al., "Self-Adaption in Real-Parameter Genetic Algorithms With Simulated binary Crossover," Gecco '99/Genetic Algorithms, * pages, Kanpur Genetic Algorithms Laboratory (KanGAL), Department of Mechanical Engineering, Indian Institute Of Technology KanPur, India and Department Of Computer Science/XI, University of Dortmund, Dortmund, Germany.

Deb, K. et al., "Simulated Binary Crossover For Continuous Search Space," Nov. 1994, pp. 1-33, IITK/ME/SMD-94027, Convenor, Technical Reports, Department Of Mechanical Engineering, Indian Institute Of Technology, Kanpur, India.

De Bonet, J. et al., "MIMIC: Finding Optima By Estimating Probability Densities," Advances In Neural Information Processing Systems, 1997, 8 pages, MIT Press, Cambridge, MA.

"Genetic Algorithms For Optimization Taking Account Of Characteristics Preservstion," pp. 1-110.

Harik, G., "Linkage Learning Via Probabilistic Modeling In The ECGA," IlliGAL Technical Report 99010, Jan. 1999, 19 pages, Illinois Genetic Algorithms Laboratory, Department of General Engineering, Urbana, IL.

Harik, G. et al., "The Compact Genetic Algorithm," IlliGAL Report No. 97006, Aug. 1997, pp. 1-21, Illinois Genetic Algorithms Laboratory, Department Of General Engineering, University Of Illinois At Urbana-Champaign, Urbana, IL.

Jin, Y. et al., "Connectedness, Regularity And The Success Of Local Search In Evolutionary Multi-Objective Optimization," 8 pages, Honda Research Institute Europe, Offenbach/M, Germany.

Khan, N. et al., "Multi-Objective Bayesian Optimization Algorithm," IlliGAL Report No. 2002009, Mar. 2002, pp. 1-10, Illinois Genetic Algorithms Laboratory, University Of Illinois At Urbana-Champaign, Urbana, IL.

Larranaga, P. et al., "Optimization By Learning And Simulation Of Bayesian And Gaussian Networks," Technical Report EHU-KZAA-IK-4/99, Dec. 31, 1999, pp. 1-70, Intelligent Systems Group, Dept. Of Computer Science Science And Artificial Intelligence, University Of The Basque Country.

Laumanns, M. et al., "Bayesian Optimization Algorithms For Multi-Objective Optimization," 10 pages, ETH Zurich, Computer Engineering And Networks Laboratory and VUT Brno, Faculty Of Information Technology, Brno.

Lobo, F. et al., "Extended Compact Genetic Algorithm In C++," IlliGAL Report 99016, Jun. 1999, pp. 1-4, Illinois Genetic Algorithms Laboratory, Department Of General Engineering, University Of Illinois At Urbana-Champaign, Urbana, IL.

Muhlenbein, H., "The Equation For The Response To Selection And Its Use For Prediction," pp. 1-46, RWCP Theoretical Foundation GMD Laboratory, Sankt Augustin.

Muhlenbein, H. et al., "Evolutionary Algorithms: From Recombination To Search Distributions," pp. 1-39, RWCP Theoretical Foundation GMD Laboratory, Sankt Augustin.

Muhlenbein, H. et al., "Evolutionary Synthesis Of Bayesian Networks For Optimization," MIT Press Math6x9, Sep. 1999, pp. 1-27.

Muhlenbein, H. et al., "The Factorized Distribution Algorithm For Additively Decomposed Functions," Proceedings Of The 1999 Congress On Evolutionary Computation, 1999, IEEE Press, pp. 752-759, Real World Computing Partnership, Theoretical Foundation GMD Laboratory, Sankt Augustin, Germany.

Muhlenbein, H. et al., "FDA—A Scalable Evolutionary Algorithm For The Optimization Of Additively Decomposed Functions," Evolutionary Computation, 1999, pp. 45-68, vol. 7, No. 1, Theoretical Foundation GMD Lab, Real World Computing Partnership, GMD FZ Informationstechnik, St. Augustin.

Muhlenbein, H. et al., "From Recombination Of Genes To The Estimation Of Distributions I. Binary Parameters," 10 pages, GMD—Forschungszentrum Informationstechnik, Sankt Augustin, Germany.

Okabe, T. et al., "Evolutionary Multi-Objective Optimisation With A Hybrid Representation," 8 pages, Honda Research Institute Europe, Offenbach/M, Germany.

Ono, I. et al., "A Robust Real-Coded Genetic Algorithm Using Unimodal Normal Distribution Crossover Augmented By Uniform Crossover: Effects For Self-Adaptation Of Crossover Probabilities," 8 pages, University of Tokushima, Tokushima, Japan, Tokyo Institute Of Technology, Technology, Yokohama, Japan and Tokyo Institute Of Technology, Yokohama, Japan.

Ono, I. et al., "A Real-Coded Genetic Algorithm For Function Optimization Using The Unimodal Normal Distribution Crossover," Technical Papers, 1999, pp. 1-11, University Of Tokushima, Tokushima, Japan, National Defence Academy, Yokosuka, Japan and Tokyo Institute Of Technology, Yokohama, Japan.

Paul, T. et al, "Reinforcement Learning Estimation Of Distribution Algorithm," 12 pages, Graduate School Of Frontier Sciences, The University Of Tokyo, Tokyo, Japan.

Pelikan, M. et al., "BOA: The Bayesian Optimization Algorithm," 8 pages, Illinois Genetic Algorthms Laboratory, Department Of General Engineering, University Of Illinois At Urbana-Champaign.

Pelikan, M. et al., "BOA: The Bayesian Optimization Algorithm," IlliGAL Report No. 99003, Jan. 1999, pp. 1-12, Illinois Genetic Algorithms Laboratory, University Of Illinois At Urbana-Champaign, Urnana, IL.

Pelikan, M. et al., "Linkage Problem, Distribution Estimation, And Bayesian Networks," IlliGAL Report No. 98013, Nov. 1998, pp. 1-24, Illinois Genetic Algorithms Laboratory, University Of Illinois At Urbana-Champaign, Urbana, IL.

Pelikan, M. et al., "Marginal Distributions In Evolutionary Algorithms," pp. 1-6, Slovak Technican University, Bratislava, Slovakia and GMD Forschungszentrum Informationstechnik, Sankt Augustin, Germany.

Pelikan, M. et al., "A Survey Of Optimization By Building And Using Probabilistic Models," IlliGAL Report No. 99018, Sep. 1999, pp. 1-11, Illinois Genetic Algorithms Laboratory, University Of Illinois At Urbana-Champaign, Urbana, IL.

Rudlof, S. et al., "Stochastic Hill Climbing With Learning By Vectors Of Normal Distributions," Aug. 5, 1996, pp. 1-11, Fraunhofer-Institut For Production Systems And Design Technology (IPK), Berlin.

Sebag, M. et al., "Extending Population-Based Incremental Learning To Continuous Search Spaces," 10 pages, Ecole Polytechnique, Palaiseau Cedex and Universite d'Orsay, Orsay Cedex.

Thierens, D. et al., "Multi-Objective Mixture-Based Iterated Density Estimation Evolutionary Algorithms," 8 pages, Institute Of Information And Computing Sciences, Utrecht University, Utrecht, The Netherlands.

Tsutsui, S. et al., "Evolutionary Algorithm Using Marginal Histogram Models In Continuous Dormain," IlliGAL Report No. 2001019, Mar. 2001, pp. 1-16, Illinois Genetic Algorithms Laboratory, University Of Illinois At Urbana-Champaign, Urbana, Illinois.

Tsutsui, S. et al., "Multi-Parent Recombination With Simplex Crossover In Real Coded Genetic Algorithms," 8 pages, Department Of Management And Information Science, Hannan University, Osaka, Japan and Graduate School Of Interdisciplinary Science And Engineering, Tokyo Institute Of Technology, Yokohama, Japan.

Tsutsui, S., "Sampling Bias And Search Space Boundary Extension In Real Coded Genetic Algorithms," 8 pages, Department Of MAnagement And Information Science, Hannan University, Osaka, Japan.

Tsutsui, S. et al., "Search Space Boundary Extension Method In Real-Coded Genetic Algorithms," Information Sciences, May 2001, pp. 229-247, vol. 133, No. 3-4, Department Of Management And Information Science, Hannan University, Osaka, Japan and Illinois Genetic Algorithms Laboratory, University Of Illinois At Urbana-Champaign, Urbana, IL.

Tsutsui, S. et al., "Simplex Crossover And Linkage Identifications: Single-Stage Evolution VS. Multi-Stage Evolution," IEEE, 2002, 6 pages, Department Of Management And Information, Hannan University, Osaka, Japan and Illinois Genetic Algorithms Laboratory, Department Of General Engineering, University Of Illinois At Urbana-Champaign, Urbana, IL.

Tsutsui, S. et al., "Simplex Crossover And Linkage Learning In Real-Coded GAs," Genetic Algorithms: Poster Paper, p. 785, Department Of Management And Information Science, Hannan University, Osaka, Japan and Illinois Genetic Algorithms Laboratory, University Of Illinois At Urbana-Champaign, Urbana, IL.

Tsutsui, S. et al., "Probabilistic Model-Building Genetic Algorithms Using Marginal Histograms In Continuous Domain," KES' 01, N. Baba et al. (Eds.), IOS Press, 2001, pp. 112-121, Department Of Management And Information, Hannan University, Osaka, Japan and Illinois Genetic Algorithms Laboratory, Department Of General Engineering, University Of Illinois At Urbana-Champaign, Urbana, IL.

Ueda, T. et al., "Efficient Numerical Optimization Technique Based On Real-Coded Genetic Algorithm," Genome Informatics, 2001, pp. 451-453, vol. 12, Graduate School Of Bioresource And Bioenvironmental Sciences, Kyushu University, Fukuoka, Japan and Department Of Biochemical Engineering and Science, Kyushu Institute Of Technology, Fukuoka, Japan.

What Is Voronoi Diagram In $R^d$ ?, 2 pages.

Agrez, D. "Active Power Estimation By Averaging of the DFT Coefficients," Proceedings of the $17^{th}$ IEEE Instrumentation and Measurement Technology Conference, May 1-4, 2000, pp. 630-635, vol. 2.

Chen Y. et al., "Feature Subimage Extraction for Cephalogram Langmarking", Proc. of the $20^{th}$ Annual International Conference of the IEEE Engineering in Medicine and Biology Society, Oct. 29, 1998, pp. 1414-1417.

Costa, M. et al., MOPED: A Multi-Objective Parzen-Based Estimation of Distribution Algorithm for Continuous Problems, Polytechnic of Turin, 13 pages, Turin, Italy.

Crump, K.S., "Numerical Inversion of Laplace Transforms Using a Fourier Series Approximation," Journal of the ACM (JACM), Jan. 1976, vol. 23, No. 1.

Dasgupta, D. et al.., Evolutionary Algorithms in Engineering Applications, 1997, 3-23, Springer-Verlag.

Dash, P.K. et al., "Genetic Optimization of a Self Organizing Fuzzy-Neural Network for Load Forecasting," IEEE Power Engineering Society Winter Meeting, Jan. 23-27, 2000. pp. 1011-1016, vol. 2.

Deb, K., Evolutionary Algorithms for Multi-Criterion Optimization in Engineering Design, In Miettinen et al., Evolutionary Algorithms in Engineering and Computer Science, 1999, pp. 135-161, John Wiley and Sons, Ltd., Chichester, UK.

Eshelman, L, et al., "Crossover Operator Biases: Exploiting the Population Distribution," Proceedings of the Seventh International Conference on Genetic Algorithms, 1997, pp. 354-361.

Eshelman, L. et al., "Real-Coded Genetic Algorithms and Interval-Schemata," Philips Laboratories, pp. 187-202, New York, New York, US.

European Search Report, EP Application No. 00124824, Jun. 14, 2001, 3 pages.

European Search Report, EP Application No. 0124825, May 14, 2001, 3 pages.

Fukuda, K., August 26, 2004, What is Voronoi Diagram in $R^d$?. [online] [Retrieved on Aug. 18, 2005] Retrieved from the Internet<URL:http://www.ifor.math.ethz.ch/~fukuda/polyfaq/node29.html>.

Graves, R.W. et al., "Acoustic Wavefield Propagation Using Paraxial Explorators," ACM, 1988, pp. 1157-1175.

Grierson, D.E. et al., "Optimal Sizing, Geometrical and Topological Design Using a Genetic Algorithm", Structural Optimization, 1993, pp. 151-159, vol. 6.

Guerin, S. ObjectGarden: Evolving Behavior of Agents via Natural Selection on Weights and Topologies of Neural Networks,: May 1999, pp. 1-15.

Gupta, N. et al., "Automated Test Data Generation Using an Iterative Relaxation Method," Proceedings of the $6^{th}$ ACM SIGSOFT International Symposium on Foundations of Software Engineering, ACM SIGSOFT Software Engineering Notes, Nov. 1998, vol. 23, No. 6.

Harik, G. et al., "The Compact Genetic Algorithm," IEEE, 1998, pp. 523-528.

Ishibuchi, H. et al., "Local Search Procedures In A Multi-Objective Genetic Local Search Algorithm For Scheduling Problems," IEEE, 1999, pp. 665-670.

Jin, Y. et al., "On Generating FC3 Fuzzy Rule Systems From Data Using Evolution Strategies," IEEE Transactions on Systems, Man and Cybemetics Part B, Dec. 1999, pp. 829-845, vol. 29, No. 6.

Kita, H. et al., "Multi-Parental Extension of the Unimodal Normal Distribution Crossover for Real-Coded Genetic Algorithms," IEEE, 1999, pp. 1581-1588.

Knowles, J. et al., "The Pareto Archived Evolution Strategy: A New Baseline Algorithm For Pareto Multiobjective Optimization," IEEE, 1999, pp. 98-105.

Kvasnicka, V. et al., "Hill Climbing with Learning (An Abstraction of Genetic Algorithm)", Slovak Technical University, 6 pages, Bratislava, Slovakia.

Li et al., "Text Enhancement in Digital Video Using Multiple Frame Integration," Proceedings of the Seventh ACM International cConference on Multimedia (Part 1), October 1999, pp. 19-22.

Lohn, J. D. et al., "A Comparison Of Dynamic Fitness Schedules For Evolutionary Design Of Amplifiers," 6 pages.

Mitlöhner, "Classifier Systems and Economic Modeling," Proceedings of the Conference on Designing the Future. ACM SIGAOLAPL Quote Quad, Jun. 1996, vol. 26, No. 4.

Ono, I. et al., "A Real-Coded Genetic Algorithm for Function Optimization Using Unimodal Normal Distribution Crossover," Proceedings of the Seventh International Conference on Genetic Algorithms, pp. 246-253, 1997.

Ratle, A., "Accelerating the Convergence of Evolutionary Algorithms by Fitness Landscape Approximation", Parallel Prroblem Solving from Nature—PPSN V.$5^{th}$ International Conference Proceedings, Sep. 1998, pp. 87-96.

Ratle, A., "Optimal Sampling Stratefies for Learning a Fitness Model", Proc. of 1999 Congress on Evolutionary Computation, Jul. 9, 1999, pp. 2078-2085, vol. 3.

Redmond, J., "Actuator Placement Based on Reachable Set Optimization for Expected Disturbance", Journal of Optimization Theory and Applications, Aug. 1996, pp. 279-300. vol. 90, No. 2.

Sendhoff, B., "Evolutionary Optimised Ontogenetic Neural Networks with Incremental Problem Complexity During Development," Proceedings of the 2000 Congress on Evolutionary Computation, Jul. 16-19, 2000, pp. 1443-1450, vol. 2.

Takahashi, M. et al., "A Crossover Operator Using Independent Component Analysis for Real-Coded Genetic Algorithms," Tokyo Institue of Technology and National Institution for Academic Degrees, 7 pages, Japan.

Tuson, A. et al., "Adapting Operator Settings In Genetic Algorithm," Final Draft of The Paper Which Will Appear In Evolutionary Computation, Mar. 25, 1998, pp. 1-17.

Van Veldhuizen, D.A. et al., Multiobjective Evolutionary Algorithms: Analyzing the State-of-the-Art, Evolutionary Computation, 2000, 125-147, vol. 8, No. 2, The MIT Press, Cambridge, MA.

Yu, M. et al., "Genetic Algorithm Approach to Image Segmentation using Morphological Operations", Image Processing, ICIP 1998, IEEE, Oct. 1998, pp. 775-779, vol. 3.

Zhang, B., "A Bayesian Framework for Evolutionary Computation," IEEE, 1999, pp. 722-728.

Angeline, Peter J., "Adaptive And Self-Adaptive Evolutionary Computations," Computational Intelligence: A Dynamic Systems Perspective, Palaniswami et al. (EDS), 1995, pp. 152-163.

Back, T et al., "Evolutonary Computation: Comments on the History and Current State," IEEE Transactions on Evolutionary Computation, Apr. 1997, pp. 3-17, vol. 1, No. 1.

Back, T. et al., "A Survey of Evolution Strategies," Proc. of the $4^{th}$ Int'l Conf. on Genetic Algorithms, Jul. 1991, pp. 2-9.

Carson, Y. et al., "Simulation Optimization: Methods and Applications," Proc. of the $29^{th}$ Winter Simulation Conf., 1997, pp. 118-126.

Eiben, A. et al., "Parameter Control In Evolutionary Algorithms," IEEE Transactions On Evolutionary Computation, vol. 3, No. 2, 1999, pp. 124-141.

European Search Report, EP Application No. 01104723, Aug. 22, 2001, 3 pages.

Fagarasan, F., "A Genetic Algor ithm With Variable Length Genotypes. Applications In Fuzzy Modeling," Proceedings Of the Fourth European Congress on Intelligent Techniques, EUFIT '96, vol. 1, 2-5, Sep. 1996, pp. 405-409.

Koumoutsakos, P. et al., "Evolutionary Strategies for Parameter Optimization in Jet Flow Control," Center of Turbulence Research Annual Research Briefs, 1998.

Muller, S. et al., "Application of Machine Learning Algorithms to Flow Modeling and Optimization," Center of Turbulence Research Annual Research Briefs, 1999.

Pittman, J. et al., "Fittiing Optimal Piecewise Linear Functions Using Genetic Algorithms," IEEE Transactions on Pattern Analysis and Machine Intelligence, Jul. 2000, pp. 701-718, vol. 22, Issue 7.

Sbalzarini, I. et al., "Evolutionary Optimization for Flow Experiments," Center of Turbulence Research Annual Research Briefs, 2000.

Srikanth, R. et al., "A Variable-Length Genetic Algorithm For Clustering And Classification," Pattern Recognition Letters; North-Holland Publ. Amsterdam, NL, vol. 16, No. 8, Aug. 1, 1995, pp. 789-800.

Weinert, K. et al., "Discrete NURBS-Surface Approximation Using An Evolutionaary Strategy," REIHE CI 87/00, SFB 531, 2000, pp. 1-7.

Yao, X. et al., "Making Use of Population Information in Evolutionary Artificial Neural Networks," IEEE Transactions on Systems, Man, and Cybernetics—Part B: Cybernetics, June 1998, pp. 417-425, vol. 28, No. 3.

* cited by examiner

| | |
|---|---|
| S11. | Choose k patterns randomly as the cluster centers |
| S12. | Assign each pattern to its closest cluster center |
| S13. | Recompute the cluster center using the current cluster members |
| S14. | If the convergence criterion is not met, go to step S12; otherwise stop |

State-of-the-art k-means algorithm

Fig. 1

| | |
|---|---|
| S21. | Prepare the training and test data |
| S22. | Generate N (ensemble size) neural networks using Genetic Algorithm (GA) |
| S23. | Calculate the error correlation between the ensemble members |
| S24. | Determine the optimal weight for each network by using Evolution Strategy (ES) |

Algorithm for constructing neural network ensemble

Fig. 2

| S31. | Initialize $\lambda$ individuals, evaluate all individuals using the original fitness function |
|---|---|
| S32. | For each generation: |
| S32a. | select the best $\mu$ individuals |
| S32b. | generate $\lambda$ offspring individuals by recombination and mutation |
| S32c. | evaluate<br>- clustering the $\lambda$ individuals using the k-means algorithm (S32d),<br>- select the $\xi$ individuals closest to the cluster centers (S32e),<br>- evaluate the $\xi$ selected individuals of step S32e using the original fitness function (S32f),<br>- construct the neural network ensemble (S32g), and<br>- calculate the fitness of the remaining $\lambda$-$\xi$ individuals using the neural network ensemble. (S32h)<br>- for the $\lambda$-$\xi$ individuals, calculate the variance of output of the ensemble members. If the variance is larger than a given threshold, replace the fitness value with that of the individual closest to the cluster center |
| S33. | Go to step S32 if the termination condition is not met |
| S34. | Stop |

Evolutionary optimization algorithm

Fig. 3

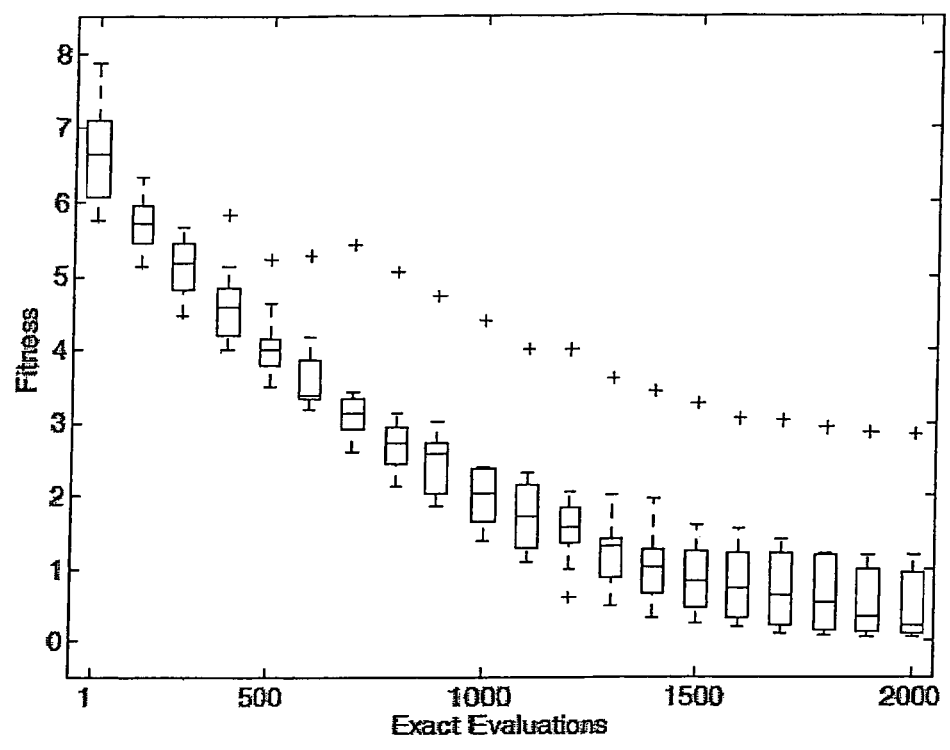
(a)
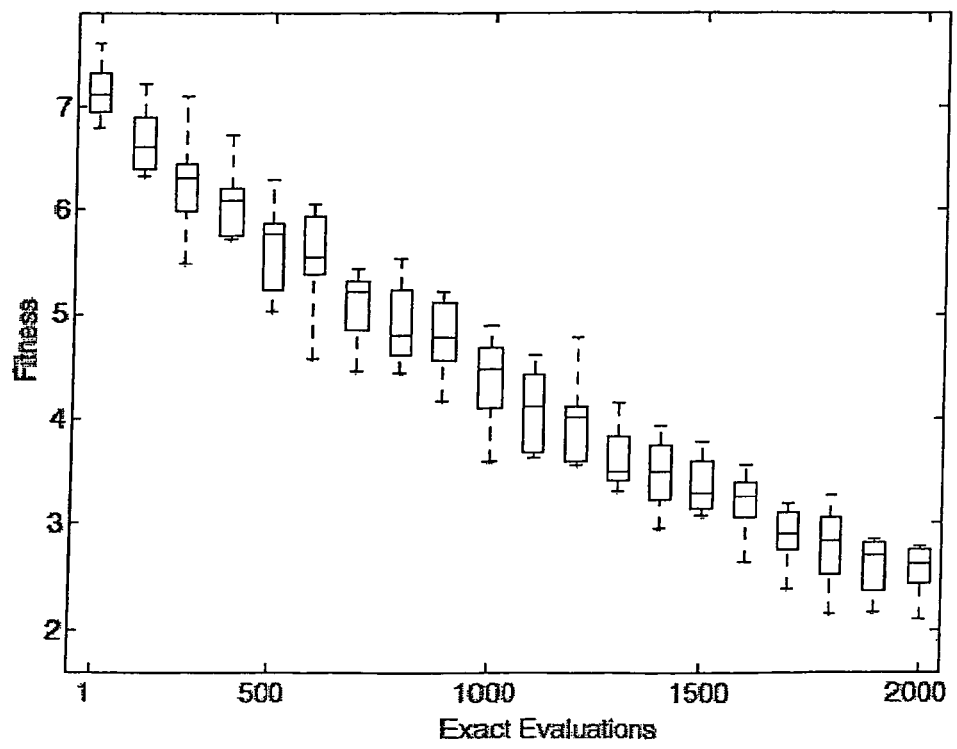
(b)
Fig. 7

(a)

(b)

REDUCTION OF FITNESS EVALUATIONS USING CLUSTERING TECHNIQUES AND NEURAL NETWORK ENSEMBLES

CROSS-REFERENCE TO RELATED APPLICATIONS

This application is related to and claims priority from European Patent Applications No. 04 001 615.6 filed on Jan. 26, 2004 and 04 010 194.1 filed on Apr. 29, 2004, which are all incorporated by reference herein in their entirety. This application is related to U.S. application Ser. No. 11/033,767 filed on Jan. 11, 2005.

FIELD OF THE INVENTION

The underlying invention generally relates to the field of evolutionary computation, especially to the reduction of the number of fitness evaluations in evolutionary algorithms (EA).

BACKGROUND OF THE INVENTION

The background art references used in the present description are summarized and commented on in a table at the end of the detailed description section. Each of the references cited in this table is hereby incorporated by reference in its entirely. Whenever in the present specification reference is made to the background art (in brackets), it is to be understood that the corresponding document is incorporated thereby by reference.

Many difficulties can arise in applying evolutionary algorithms to solve complex real-world optimization problems. One of the main concerns is that evolutionary algorithms usually need a large number of fitness evaluations to obtain a good solution. Unfortunately, fitness evaluations are often time-consuming. Taking aerodynamic design optimization as an example, one evaluation of a given design based on the 3-Dimensional Computational Fluid Dynamics (CFD) Simulation can take hours even on a high-performance computer.

To alleviate the fact that evolutionary computation is often time consuming, computationally efficient models can be set-up to approximate the fitness function. Such models are often known as approximate models, meta-models or surrogates. For an overview of this topic, see Y. Jin and B. Sendhoff, Fitness approximation in evolutionary computation—A survey, Proceedings of the Genetic and Evolutionary Computation Conference, pages 1105-1112, 2002, which is incorporated by reference herein in its entirety. It would be ideal if an approximate model can fully replace the original fitness function, however, research has shown that it is in general advisable to combine the approximate model with the original fitness function to ensure the evolutionary algorithm to converge correctly. To this end, past solutions require re-evaluation of some individuals using the original fitness function, also termed as evolution control in Y. Jin, M. Olhofer, and B. Sendhoff, On evolutionary optimization with approximate fitness functions, Proceedings of the Genetic and Evolutionary Computation Conference, pages 786-792, Morgan Kaufmann, 2000, which is incorporated by reference herein in its entirety.

Generation-based or individual-based evolution control can be implemented. In the generation-based approach (see A. Ratle Accelerating the convergence of evolutionary algorithms by fitness landscape approximation, A. Eiben, Th. Bäck, M. Schoenauer and H.-P. Schwefel, editors, Parallel Problem Solving from Nature, volume V, pages 87-96, 1998; M. A. El-Beltagy, P. B. Nair, and A. J. Keane, Metamodeling techniques for evolutionary optimization of computationally expensive problems: promises and limitations, in Proceedings of Genetic and Evolutionary Conference, pages 196-203, Orlando, 1999. Morgan Kaufmann; Y. Jin, M. Olhofer, and B. Sendhoff, On evolutionary optimization with approximate fitness functions, in Proceedings of the Genetic and Evolutionary Computation Conference, pages 786-792, Morgan Kaufmann, 2000; Y. Jin, M. Olhofer, and B. Sendhoff, A framework for evolutionary optimization with approximate fitness functions, IEEE Transactions on Evolutionary Computation, 6(5):481-494, 2002, which are all incorporated by reference herein in their entirety) some generations are evaluated using the approximate model and the rest using the original fitness function. In individual-based evolution control, part of the individuals of each generation are evaluated using the approximation model and the rest using the original fitness function. See Y. Jin, M. Olhofer, and B. Sendhoff, On evolutionary optimization with approximate fitness functions, in Proceedings of the Genetic and Evolutionary Computation Conference, pages 786-792, Morgan Kaufmann, 2000; M. Emmerich, A. Giotis, M. Ozdenir, T. Bäck, and K. Giannakoglou, Metamodel assisted evolution strategies, In Parallel Problem Solving from Nature, number 2439 in Lecture Notes in Computer Science, pages 371-380, Springer, 2002; H. Ulmer, F. Streicher, and A. Zell, Model-assisted steady-state evolution strategies, in Proceedings of Genetic and Evolutionary Computation Conference, LNCS 2723, pages 610-621, 2003; J. Branke and C. Schmidt, Fast convergence by means of fitness estimation. Soft Computing, 2003, which are all incorporated by reference herein in their entirety. Generally speaking, the generation-based approach is more suitable when the individuals are evaluated in parallel, where the duration of the optimization process depends to a large degree on the number of generations needed. By contrast, the individual-based approach is better suited when the number of evaluations is limited, for example, when an experiment needs to be done for a fitness evaluation.

On the other hand, individual-based evolution control provides more flexibility in choosing which individuals need to be re-evaluated. In Y. Jin, M. Olhofer, and B. Sendhoff, On evolutionary optimization with approximate fitness functions, Proceedings of the Genetic and Evolutionary Computation Conference, pages 786-792, Morgan Kaufmann, 2000, which is incorporated by reference herein in its entirety, it is suggested to choose the best individuals according to the approximate model rather than choosing the individuals randomly. In M. Emmerich, A. Giotis, M. Ozdenir, T. Bäck, and K. Giannakoglou, Metamodel assisted evolution strategies, Parallel Problem Solving from Nature, number 2439 in Lecture Notes in Computer Science, pages 371-380, Springer, 2002, which is incorporated by reference herein in its entirety, not only the estimated function value but also the estimation error is taken into account. The basic idea is that individuals having a larger estimation error are more likely to be chosen for re-evaluation. Other uncertainty measures have also been proposed in J. Branke and C. Schmidt, Fast convergence by means of fitness estimation, Soft Computing, 2003, which is incorporated by reference herein in its entirety.

In H.-S. Kim and S.-B. Cho, An efficient genetic algorithms with less fitness evaluation by clustering, Proceedings of IEEE Congress on Evolutionary Computation, pages 887-894, IEEE, 2001, which is incorporated by reference herein in its entirety, the population of a genetic algorithm (GA) is grouped into a number of clusters and only one representative individual of each cluster is evaluated using the fitness function. Other individuals in the same cluster are estimated according to their Euclidean distance to the representative individuals. Obviously, this kind of estimation is very rough and the local feature of the fitness landscape is completely ignored.

SUMMARY OF THE INVENTION

In view of the prior art, it is the object of the present invention to propose a computationally efficient model for fitness evaluations to assist the evolutionary algorithms.

In an exemplary embodiment of the proposed invention, the population is grouped into a number of clusters, and only the individual that is closest to the cluster center is evaluated using the original fitness function. In contrast to the distance-based estimation method, H.-S. Kim and S.-B. Cho, An efficient genetic algorithms with less fitness evaluation by clustering, Proceedings of IEEE Congress on Evolutionary Computation, pages 887-894, IEEE, 2001, which is incorporated by reference herein in its entirety, according to another embodiment of the invention the evaluated individuals (centers of the clusters) can be used to create a neural network ensemble, which is then used for estimating the fitness values of the remaining individuals. Both the structure and the parameters of the neural networks can be optimized using an evolutionary algorithm (EA) with Lamarckian inheritance.

To reduce the number of fitness evaluations, a further embodiment of the present invention thus proposes a computationally efficient model that can be constructed for fitness evaluations to assist the evolutionary algorithms.

Yet another embodiment of the invention suggests a method for reducing the required number of fitness evaluations using meta-models. It deals with three aspects in meta-model assisted evolutionary computation.

First, how to determine which individuals should be evaluated with the original time-consuming fitness function and which ones should be evaluated using the meta-model: An embodiment of the invention uses a clustering method using a k-means algorithm.

Second, how to improve the quality of the meta-models. A neural network ensemble has been used instead of a single neural network. Meanwhile, both the structure and parameters of the neural networks are on-line optimized using a Lamarckian evolutionary algorithm. Finally, the weights of the ensemble members are optimized using a standard Evolution Strategy (ES).

Third, how to detect a large prediction error of the meta-models. An embodiment of the invention uses the output variance of the ensemble members.

According to an embodiment of the present invention an evolutionary optimization method is proposed. In a first step, an initial population of individuals is set up and an original fitness function is applied. Then the offspring individuals having a high evaluated quality value are selected as parents. In a third step, the parents are reproduced to create a plurality of offspring individuals. The quality of the offspring individuals is evaluated by means of a fitness function, wherein selectively the original or an approximate fitness function is used. Finally, the method goes back to the selection step until a termination condition is met. The step of evaluating the quality of the offspring individuals further consists in grouping all $\lambda$ offspring individuals in clusters, selecting for each cluster one or a plurality of offspring individuals, resulting in altogether $\xi$ selected offspring individuals, evaluating the $\xi$ selected offspring individuals by means of the original fitness function and evaluating the remaining $\lambda-\xi$ offspring individuals by means of the approximate fitness function, where $\lambda$ is the total number of offspring individuals in one generation, $\xi$ is the total number of offspring individuals selected from the total number $\lambda$ of offspring individuals, and $\lambda-\xi$ is the remaining number of offspring individuals that are not selected.

According to another embodiment of the invention a computer software program product implementing a method as set forth above when running on a computing device is proposed.

According to yet another embodiment of the invention, the approximate fitness function can be a neural network ensemble comprising a plurality of neural networks. Moreover, the output of each neural network in the ensemble can be weighted and combined to the final output of the neural network ensemble. According to yet another embodiment of the invention, a Genetic Algorithm (GA) with a local search can also be used to generate the neural network ensemble.

According to yet another embodiment of the invention, an evolution strategy (ES) can be used to optimize the weights of the ensemble by minimizing an expected prediction error.

According to a further embodiment of the invention, the variance of the neural network's output in the ensemble can be derived and if the variance is larger than a given threshold, the corresponding fitness value of the individual concerned can be replaced by the value of the individual closest to the cluster center. Said variance can be used to control how many individuals in each cluster are evaluated using the original function.

According to a further embodiment of the present invention, the number of individuals to be evaluated using the original fitness function can be increased if the variance is high and decreased if the variance is low.

According to yet another embodiment of the invention, the offspring individuals chosen for evaluation with the original fitness function can be the one closest to the cluster center.

According to yet another embodiment of the invention, a k-means method can be used to group all offspring into clusters.

According to a further embodiment of the invention a use of the presented evolutionary optimization method is proposed for the optimization of hydrodynamic or aerodynamic designs, of turbine rotor and stator blades and outlet guide vanes, and of aerodynamic properties of vehicles.

DESCRIPTION OF THE DRAWINGS

FIG. 1 shows a known k-means algorithm for population clustering, according to one embodiment of the present invention.

FIG. 2 shows an algorithm for constructing neural network ensemble according to an embodiment of the present invention, according to one embodiment of the present invention.

FIG. 3 shows the evolutionary optimization algorithm according to an embodiment of the invention.

FIG. 7 shows a box plot of the optimization results for the 30-dimensional Ackley function for the proposed algorithm (a) and for Plain Evolution Strategy (ES) (b), wherein the scales in (a) and (b) are not the same, according to one embodiment of the present invention.

DETAILED DESCRIPTION OF THE PREFERRED EMBODIMENTS

Figure 4:
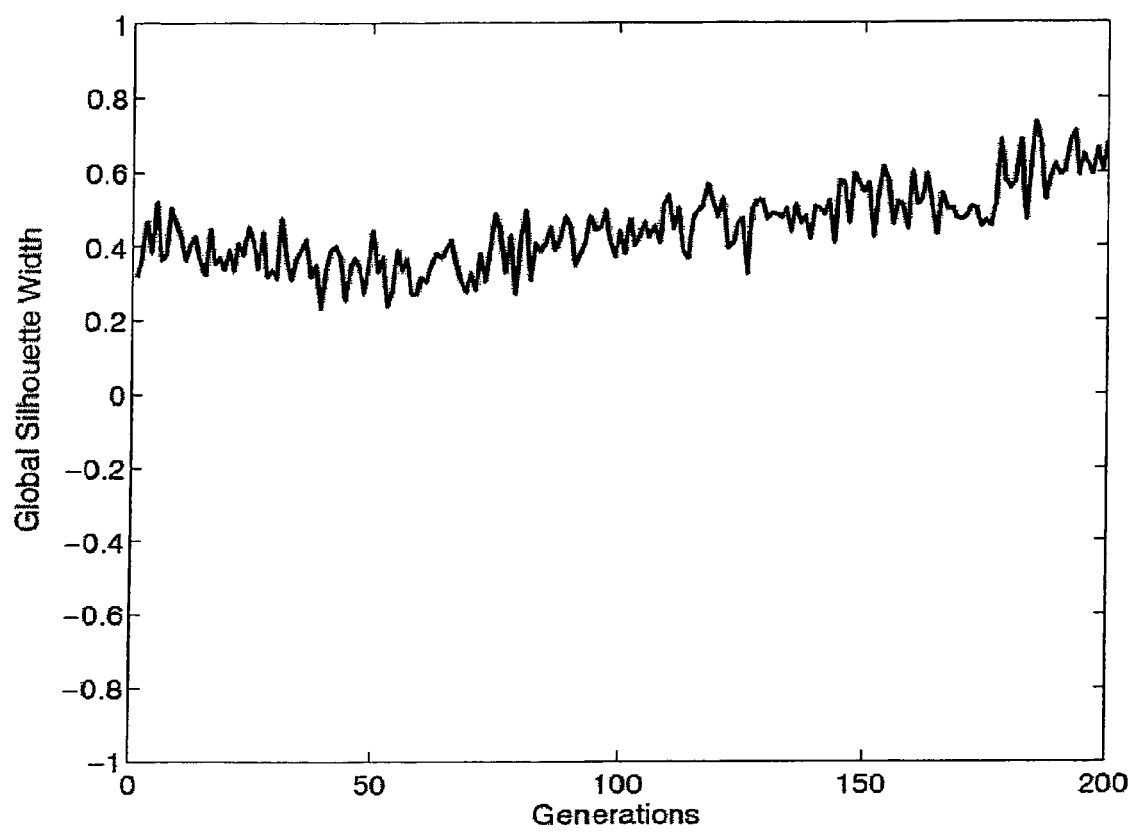
FIG. 4 shows a global silhouette width when the number of cluster is set to 10 and the population size is 30 on the 30-dimensional Ackley function, according to one embodiment of the present invention.

When approximate models are involved in evolution, it is determined which individuals should be re-evaluated using the original fitness function to guarantee a proper convergence of the evolutionary algorithm.

According to a first embodiment of the invention, the k-means method is applied to group the individuals of a population into a number of clusters. For each cluster, only the individual that is closest to the cluster center is evaluated using the expensive original fitness function. The fitness of the other individuals is estimated using a neural network ensemble, which is also used to detect possible serious prediction errors. Simulation results from three test functions show that the present invention exhibits better performance than the strategy where only the best individuals according to the approximate model are re-evaluated.

Population Clustering Using the K-means Algorithm

A variety of clustering techniques have been proposed for grouping similar patterns (data items), see A. K. Jain, M. N. Murty, and P. J. Flynn, Data clustering: A review. ACM Computing Surveys, 31(3):264-323, September 1999, which is incorporated by reference herein in its entirety. All of these clustering techniques can be used in conjunction with an embodiment of the present invention. Generally, they can be divided into:

hierarchical clustering algorithms, and partitional clustering algorithms.

A hierarchical algorithm yields a tree structure representing a nested grouping of patterns, whereas a partitional clustering algorithm generates a single partition of the patterns.

Among the partitional clustering methods, the k-means is an exemplary algorithm. It employs the squared error criterion and its computational complexity is O(n), where n is the number of patterns.

FIG. 1 shows an algorithm for population clustering which is known as such. A typical stopping criterion is that the decrease in the squared error is minimized.

A major problem of the k-means clustering algorithm is that it may converge to a local minimum if the initial partition is not properly chosen. Besides, the number of clusters needs to be specified beforehand, which is a general problem for partitional clustering algorithms. See A. K. Jain, M. N. Murty, and P. J. Flynn, Data clustering: A review, ACM Computing Surveys, 31(3):264-323, September 1999, which is incorporated by reference herein in its entirety.

To assess the validity of a given cluster, the silhouette method, in P. J. Rousseeuw, Silhouettes: A graphical aid to the interpretation and validation of cluster analysis, Journal of Computational and Applied Mathematics, 20:53-65, 1987, which is incorporated by reference herein in its entirety, can be used. For a given cluster, $X_j$, $j=1, \ldots, k$, the silhouette technique assigns the i-th member ($x_{ij}$, $i=1, \ldots, n_j$) of cluster $X_j$ a quality measure (silhouette width):

$$s_{ij} = \frac{b_i - a_i}{\max\{a_i, b_i\}} \quad \text{(Eq. 1)}$$

where $a_i$ is the average distance between $x_{ij}$ and all other members in $X_j$ and $b_i$ denotes the minimum of $a_i$, $i=1, 2, \ldots, n_j$, where $n_j$ is the number of patterns in cluster $X_j$ and naturally, $n_1 + \ldots + n_k$ equals n if each pattern belongs to one and only one cluster, n is the number of patterns to be clustered.

It can be seen that $s_{ij}$ has a value between −1 and 1. If $s_{ij}$ equals 1, it means that $s_{ij}$ is in the proper cluster. If $s_{ij}$ is 0, it indicates that $x_{ij}$ may also be grouped in the nearest neighboring cluster and if $x_{ij}$ is −1, it suggests that $x_{ij}$ is very likely in the wrong cluster. Thus, a global silhouette width can be obtained by summing up the silhouette width of all patterns:

$$S = \frac{1}{k} \sum_{j=1}^{k} \sum_{i=1}^{n_j} s_{ij}. \quad \text{(Eq. 2)}$$

Consequently, this value can be used to determine the proper number of clusters.

Construction of Neural Network Ensembles Using an Evolutionary Algorithm

After the population is grouped into a number of clusters, only the individual that is closest to each cluster center is evaluated using the original fitness function. Note that also a plurality of individuals being more or less in the center of a cluster can be selected.

In B.-T. Zhang and J. G. Joung, Building optimal committee of genetic programs, Parallel Problem Solving from Nature, volume VI, pages 231-240, Springer, 2000, which is incorporated by reference herein in its entirety, the fitness value of all other individuals are estimated based on their Euclidean distance to the cluster center. Obviously, this simplified estimation ignores the local feature of the fitness landscape which can be extracted from the evaluated cluster centers.

In Y. Jin, M. Olhofer, and B. Sendhoff, On evolutionary optimization with approximate fitness functions, In Proceedings of the Genetic and Evolutionary Computation Conference, pages 786-792. Morgan Kaufmann, 2000, and Y. Jin, M. Olhofer, and B. Sendhoff, A framework for evolutionary optimization with approximate fitness functions, IEEE Transactions on Evolutionary Computation, 6(5):481-494, 2002, which are all incorporated by reference herein in their entirety, a standard neural network has been constructed using the data generated during optimization. The neural network model is trained off-line and further updated when new data are available. One problem that may occur is that as the number of samples increases, the learning efficiency may decrease. To improve the learning efficiency, weighted learning, see Y. Jin, M. Olhofer, and B. Sendhoff, A framework for evolutionary optimization with approximate fitness functions, IEEE Transactions on Evolutionary Computation, 6(5):481-494, 2002, which is incorporated by reference herein in its entirety, and off-line structure optimization of the neural networks have been shown to be promising.

According to an embodiment of the present invention, the approximation quality can be further improved in two aspects:

First, structure optimization of the neural network is carried out on-line and only the data generated in the most recent two generations are used (S21). This makes it possible to have an approximate model that reflects the local feature of the landscape.

Second, an ensemble instead of a single neural network is used to improve the generalization property of the neural networks (S22).

The benefit of using a neural network ensemble originates from the diversity of the behavior of the ensemble members on unseen data. Generally, diverse behavior on unseen data can be obtained via the following approaches:

Using various initial random weights.
Varying the network architecture.
Employing different training algorithms.
Supplying different training data by manipulating the given training data.
Generating data from different sources.
Encouraging diversity, see D. W. Opitz and J. W. Shavlik, Generating accurate and diverse members of a neural network ensemble, In Advances in Neural Information Processing Systems, volume 8, pages 535-541, Cambridge, Mass., 1996, MIT Press, which is incorporated by reference herein in its entirety; decorrelation, see B. E. Rosen, Ensemble learning using decorrelated neural networks, Connection Science, 8(3-4): 373-384, 1996, which is incorporated by reference herein in its entirety; or negative correlation between the ensemble members, see Y. Liu and X. Yao, Negatively correlated neural networks can produce best ensemble, Australian Journal of Intelligent Information Processing System, 4(3-4):176-185, 1997, and Y. Liu, X. Yao, and T. Higuchi, Evolutionary ensembles with negative correlation learning, IEEE Transactions on Evolutionary Computation, 4(4):380-387, 2000, which are all incorporated by reference herein in their entirety.

In an exemplary embodiment of the present invention, a Genetic Algorithm (GA) can be used to generate the neural network ensemble (S22), which can provide two sources of diversity: both the architecture and the final weights of the neural networks are different. Since the goal of the neural networks is to learn the local fitness landscape, the optimization method of this embodiment only uses the data generated in the two most recent generations instead of using all data.

Assuming that the $\lambda$ individuals in the population are grouped into $\xi$ clusters, thus $\xi$ new data will be generated in each generation. Accordingly, the fitness function for evolutionary neural network generation can be expressed as follows:

$$F = \frac{1}{\xi}\left\{\alpha \cdot \sum_{i=1}^{\xi}(y_i - y_i^d(t))^2 + (1-\alpha) \cdot \sum_{i=1}^{\xi}(y_i - y_i^d(t-1))^2\right\} \quad \text{(Eq. 3)}$$

where $0.5 \leq \alpha \leq 1$ is a coefficient giving more importance to the newest data, $y_i^d(t)$, $i=1, \ldots, \xi$ are the data generated in the current generation and $y_i^d(t-1)$, $i=1, \ldots, \xi$ are those generated in the last generation and $y_i$ is the network output for the i-th data set.

Given N neural networks, the final output of the ensemble can be obtained by averaging the weighted outputs of the ensemble members:

$$y^{EN} = \sum_{k=1}^{N} w^{(k)} y^{(k)} \quad \text{(Eq. 4)}$$

where $y^{(k)}$ and $w^{(k)}$ are the output and its weight of the k-th neural network in the ensemble. In this case, the expected error of the ensemble is given by:

$$E^{EN} = \sum_{i=1}^{N}\sum_{j=1}^{N} w^{(i)} w^{(j)} C_{ij} \quad \text{(Eq. 5)}$$

where $C_{ij}$ is the error correlation matrix between network i and network j in the ensemble (S23):

$$C_{ij} = E[(y_i - y_i^d)(y_j - y_j^d)] \quad \text{(Eq. 6)}$$

where E(.) denotes the mathematical expectation.

It has been shown, see M. P. Perrone and L. N. Cooper, When networks disagree: Ensemble methods for hybrid neural networks, in R. J. Mammone, editor, Artificial Neural Networks for Speech and Vision, pages 126-142, Chapman & Hall, London, 1993, which is incorporated by reference herein in its entirety, that there exists an optimal set of weights that minimizes the expected prediction error of the ensemble:

$$w^{(k)} = \frac{\sum_{j=1}^{N}(C_{kj})^{-1}}{\sum_{i=1}^{N}\sum_{j=1}^{N}(C_{ij})^{-1}} \quad \text{(Eq. 7)}$$

where $1 \leq i,j,k \leq N$.

However, a reliable estimation of the error correlation matrix is not straightforward because the prediction errors of different networks in an ensemble are often strongly correlated.

A few methods have been proposed to solve this problem, see D. Jimenez, Dynamically weighted ensemble neural networks for classification, In Proceedings of International Joint Conference on Neural Networks, pages 753-756, Anchorage, 1998, IEEE Press; X. Yao and Y. Liu, Making use of population information in evolutionary artificial neural networks, IEEE Transactions on Systems, Man, and Cybernetics-Part B:Cybernetics, 28(3):417-425, 1998; B.-T. Zhang and J. G. Joung, Building optimal committee of genetic programs, In Parallel Problem Solving from Nature, volume VI, pages 231-240, Springer, 2000, which are all incorporated by reference herein in their entirety. Genetic programming is applied to the search for an optimal ensemble size in B.-T. Zhang and J. G. Joung, Building optimal committee of genetic programs, in Parallel Problem Solving from Nature, volume VI, pages 231-240, Springer, 2000, which is incorporated by reference herein in its entirety, whereas the recursive least-square method is adopted to optimize the weights in X. Yao and Y. Liu, Making use of population information in evolutionary artificial neural networks, IEEE Transactions on Systems, Man, and Cybernetics-Part B:Cybernetics, 28(3):417-425, 1998, which is incorporated by reference herein in its entirety. In X. Yao and Y. Liu, Making use of population information in evolutionary artificial neural networks, IEEE Transactions on Systems, Man, and Cybernetics-Part B:Cybernetics, 28(3):417-425, 1998, which is incorporated by reference herein in its entirety, a Genetic Algorithm (GA) is also used to search for an optimal subset of the neural networks in the final population as ensemble members.

A canonical Evolution Strategy (ES) can be employed to find the optimal weights (S24) to minimize the expected error in Eq. 5.

The algorithm for constructing the neural network ensemble and the entire evolutionary optimization algorithm are sketched in FIG. 2 and FIG. 3, respectively.

Experimental Setup

In the simulations, optimization runs are carried out on three well known test functions, the Ackley function, the Rosenbrock function and the Sphere function.

The dimension of the test functions are set to 30. A standard (5, 30) Evolution Strategy (ES) is used in all simulations.

To implement the evolutionary optimization with approximate fitness models, a few important parameters are to be determined, such as the number of clusters and the number of neural networks in the ensemble.

The first issue is the number of clusters. This number is relevant to performance of the clustering algorithm, the quality of the approximate model, and eventually the convergence property of the evolutionary algorithm.

A few preliminary optimization runs are carried out with only a single neural network being used for fitness approximation on the 30-dimensional Ackley function. It is found that with the clustering algorithm, the evolutionary algorithm is able to converge correctly when about one third of the population is re-evaluated using the original fitness function. When the number of the re-evaluated individuals is much fewer than one third of the population, the performance of the evolutionary algorithm becomes unpredictable, that is, the evolutionary algorithm may converge to a false minimum.

The clustering performance is then evaluated when the number of clusters is set to be one third of the population. FIG. 4 shows the global silhouette width when the cluster number is 10 and the population size is 30 on the 30-dimensional Ackley function. It can be seen that the clustering performance is acceptable.

Next, simulations are conducted to investigate the ensemble size. So far, the ensemble size has been determined heuristically in most applications. In B.-T. Zhang and J. G. Joung, Building optimal committee of genetic programs, In Parallel Problem Solving from Nature, volume VI, pages 231-240, Springer, 2000, which is incorporated by reference herein in its entirety, the optimal size turns out to be between 5 and 7. Considering the fact that a large ensemble size will increase computational cost, two cases are compared, where the ensemble size is 3 and 5 on 200 samples collected in the first 20 generations of an optimization run on the 30-dimensional Ackley function.

Figure 5:
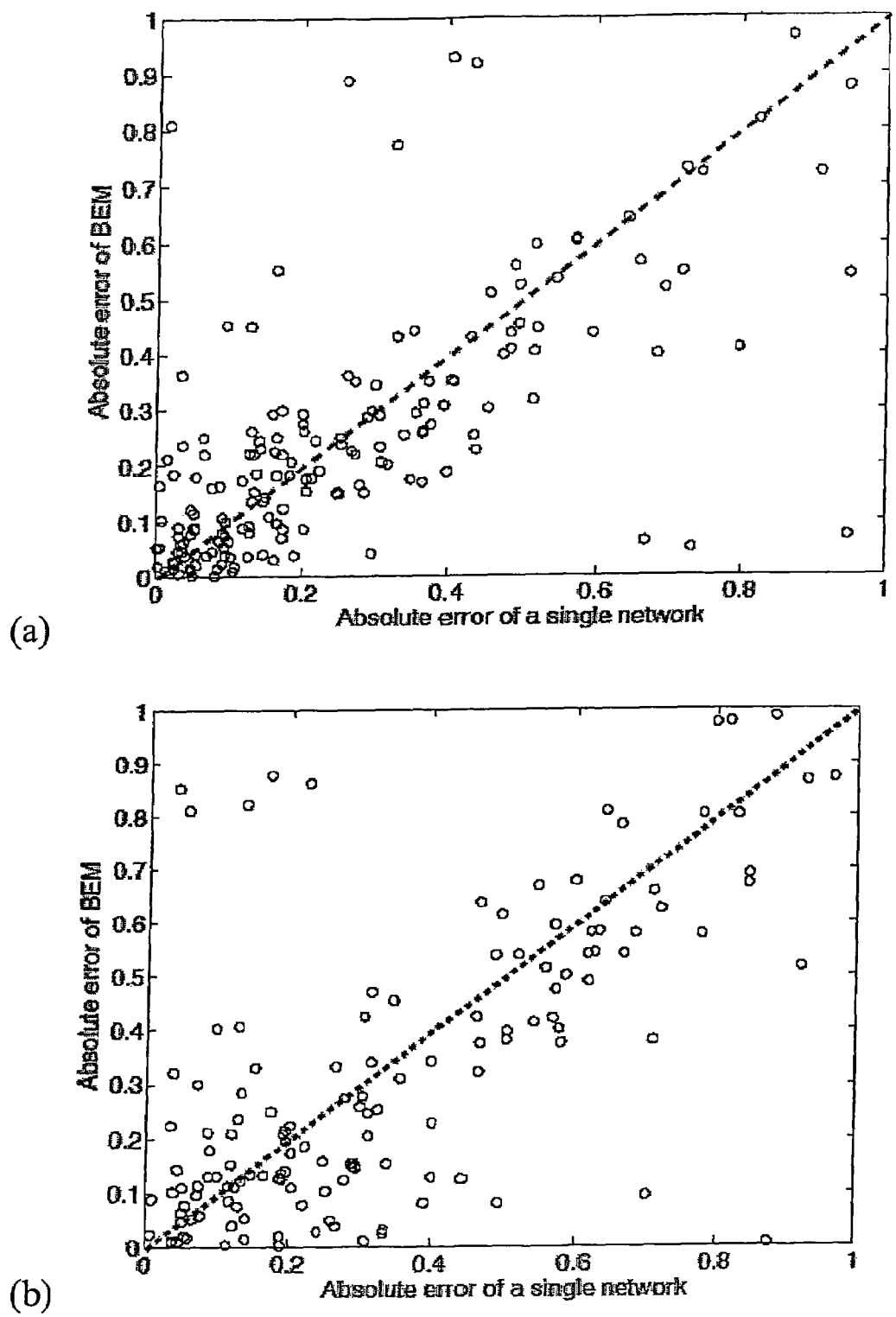
FIG. 5(a) shows an ensemble output with an ensemble size of 3.
FIG. 5(b) shows an ensemble output with an ensemble size of 5, according to one embodiment of the present invention.

The ensemble output versus that of a single network is plotted in FIG. 5, where in FIG. 5(a) the ensemble size is 3 and in FIG. 5(b) the ensemble size is 5. Note that the more points locate in the right lower part of the figure the more effective the ensemble. It can be seen from the figure that no significant performance improvement has been achieved when the ensemble size is changed from 3 to 5. Thus, the ensemble size is fixed to 3 in an exemplary embodiment.

It may seem that the use of an ensemble has not improved the prediction accuracy significantly. Thus, the motivation to employ an ensemble becomes questionable. However, the following paragraph shows that an ensemble is important not only in that it is able to improve prediction.

Figure 6:
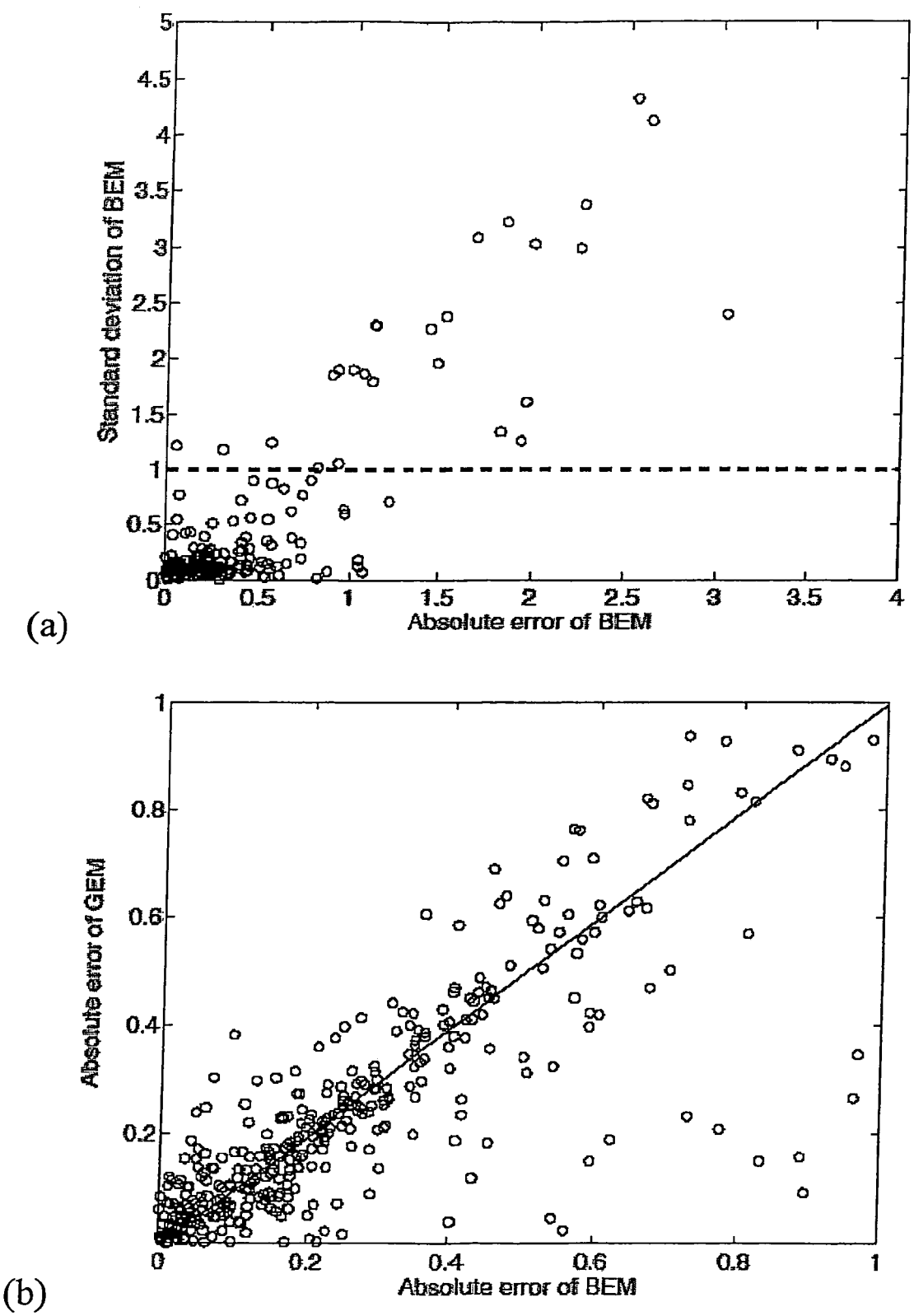
FIG. 6 shows a prediction error versus the standard deviation (a) and a prediction error of the Basic Ensemble Method (BEM) versus that of the Generalized Ensemble Method (GEM) (b), according to one embodiment of the present invention.

The equally important reason for introducing the ensemble in the optimization according to an embodiment of the invention is to estimate the prediction accuracy based on the different behaviors of the ensemble members, i.e., the variance of the members in the ensemble. To demonstrate this embodiment, FIG. 6(a) shows the relationship between the standard deviation of the predictions of the ensemble members and the estimation error of the ensemble. This data is also collected in the first 20 generations of an evolutionary run of the Ackley function. Additional function evaluations are carried out to get the prediction error. Of course, they are neither used in neural network training nor in optimization. It can be seen that a large standard deviation most probably indicates a large prediction error, although a small standard deviation does not guarantee a small prediction error. Encouraged by this close correlation between a large deviation and a large prediction error, a try to predict the model error is made. When the standard deviation is larger than a threshold (1 in this example), the model prediction is replaced by the fitness of the individual closest to the cluster center, which is a very rough but feasible approximation.

Finally, a standard Evolution Strategy (ES) with a population size of (3, 15) is used to optimize the weights of the ensemble members. The predictions of the Generalized Ensemble Method (GEM), where the weights are optimized, and that of a Basic Ensemble Method (BEM) are shown in FIG. 6(b). It can be seen that the prediction accuracy has been improved using the GEM.

Optimization Results

The evolutionary optimization method of an embodiment of the invention is applied to the exemplary optimization of three functions: Ackley function, the Rosenbrock function and the Sphere function. The maximal number of fitness evaluations is set to 2000 in all simulations.

Figure 8:
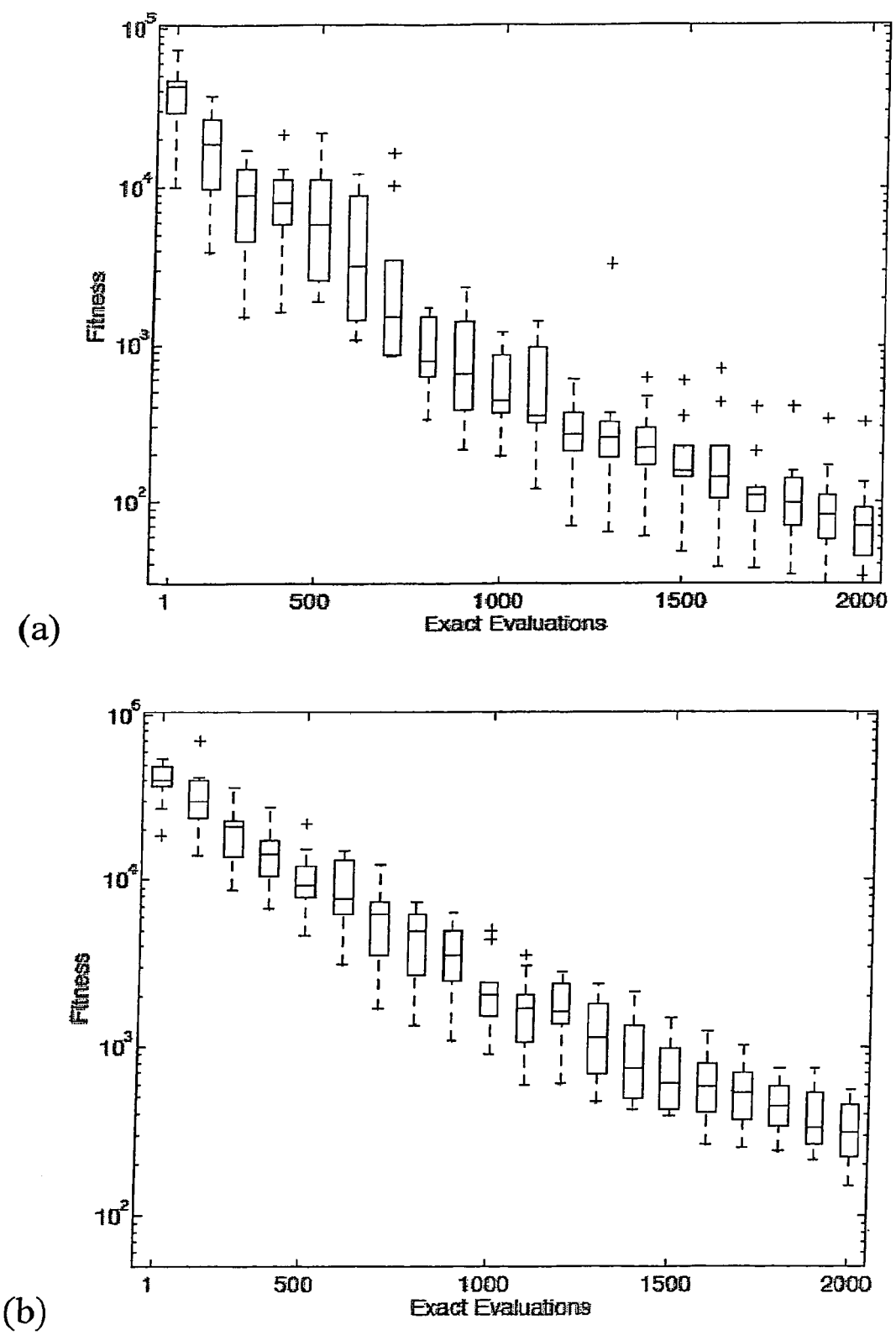
FIG. 8 shows a box plot of the optimization results for the 30-dimensional Rosenbrock function for a proposed algorithm (a) and for Plain ES (b), according to one embodiment of the present invention.
Figure 9:
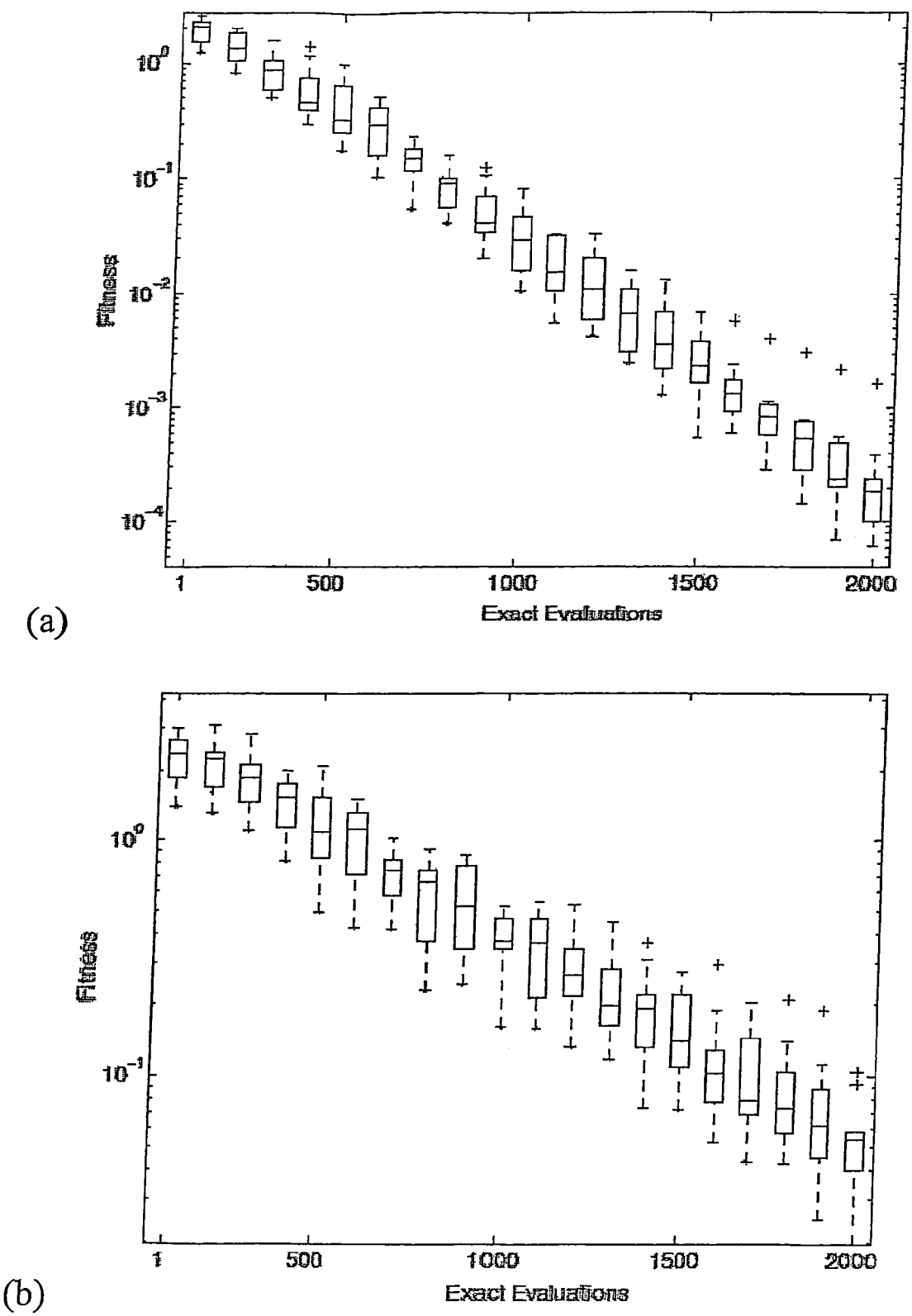
FIG. 9 shows a box plot of the optimization results for the 30-dimensional Sphere function for the proposed algorithm (a) and for Plain ES (b), wherein the scales in (a) and (b) are not the same, according to one embodiment of the present invention.

FIGS. 7, 8 and 9 show the box plots of the ten runs on the three test functions. For clarity, only 20 data points are shown in the figures, which are uniformly sampled from the original data. From these figures, it can clearly be seen that on average, the optimization results using the present invention are much better than those from the plain evolution strategy on all test functions. Meanwhile, they are also much better than the results reported in Y. Jin, M. Olhofer, and B. Sendhoff, On evolutionary optimization with approximate fitness functions, in Proceedings of the Genetic and Evolutionary Computation Conference, pages 786-792, Morgan Kaufmann, 2000, which is incorporated by reference herein in its entirety, where no clustering of the population has been implemented. As mentioned, without clustering, the evolutionary algorithm does not converge correctly if only one third of the population is re-evaluated using the original fitness function. Nevertheless, it can noticed that for the Ackley function, the result from one of the 10 runs using the proposed method is much worse than the average performance, even a little worse than the average result when the plain Evolution Strategy (ES) is used, refer to FIG. 7(a).

Figure 10:
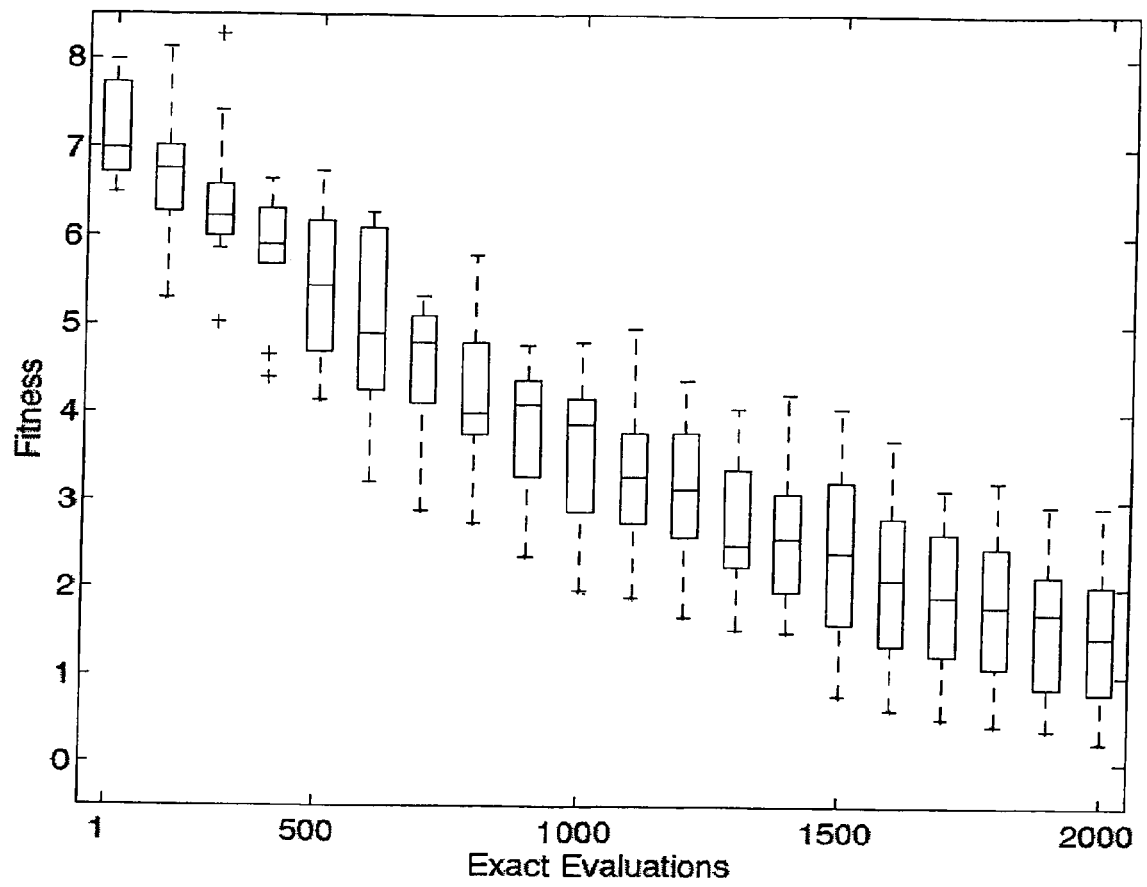
FIG. 10 shows the results for the 30-dimensional Ackley function with a single network, according to one embodiment of the present invention.
Figure 11:
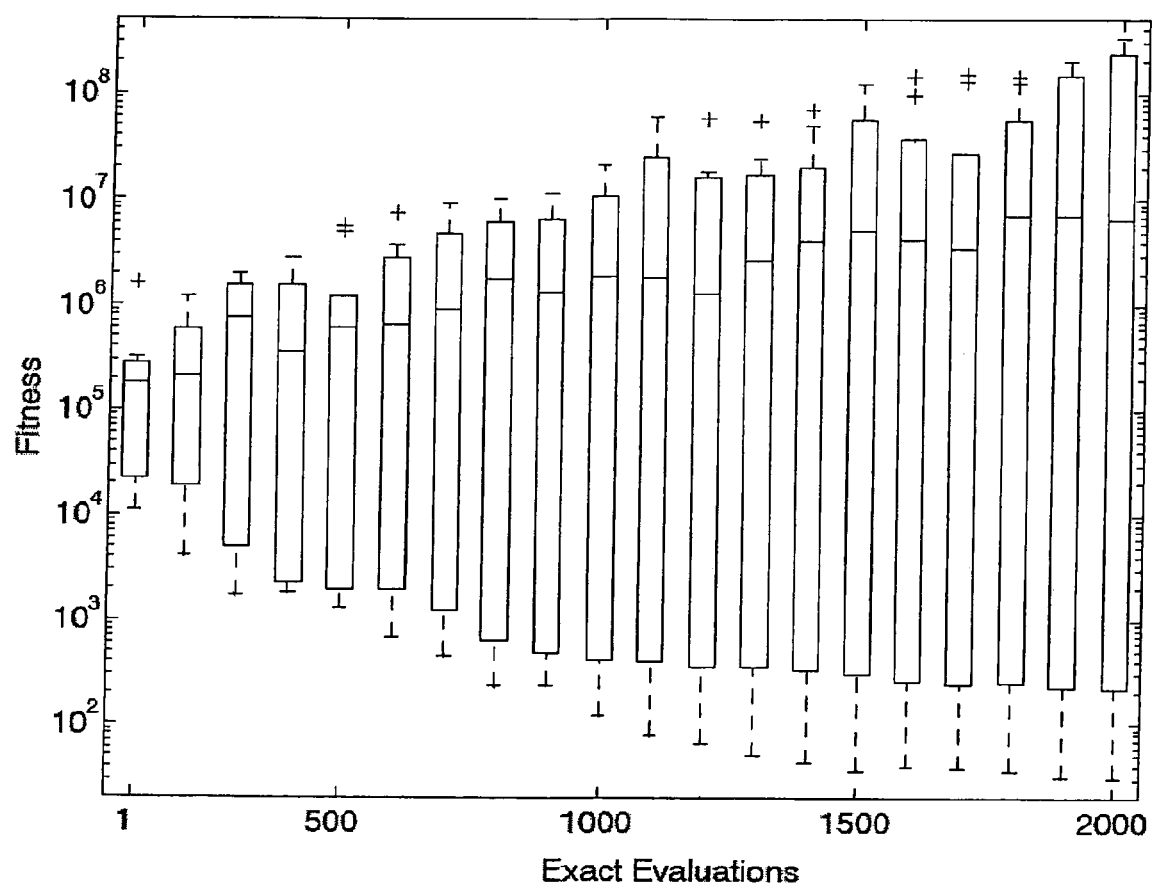
FIG. 11 shows the results for the 30-dimensional Rosenbrock function with a single network, according to one embodiment of the present invention.
Figure 12:
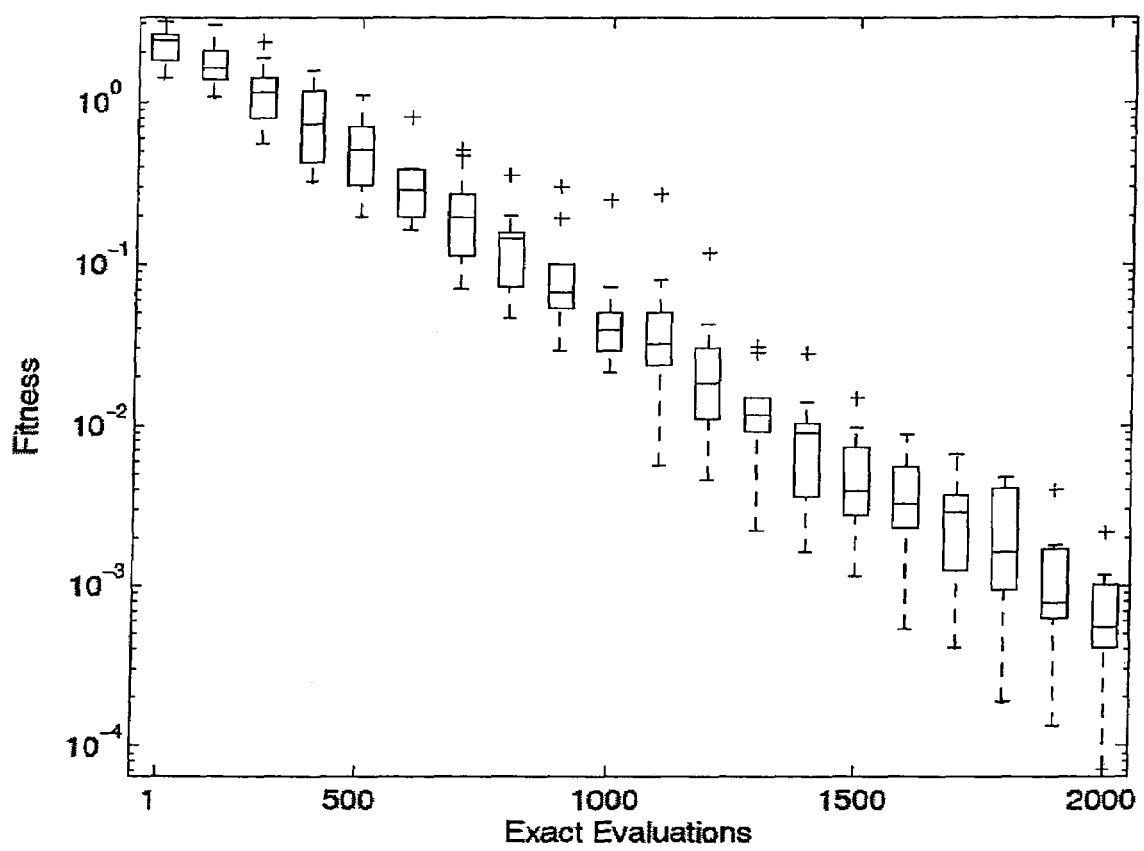
FIG. 12 shows the results for the 30-dimensional Sphere test function with a single network, according to one embodiment of the present invention.

FIGS. 10, 11 and 12 depict the box plots of results using only a single neural network (where no remedy of large prediction errors is included) on the three test functions in order to show the benefit of using the neural network ensemble according to one embodiment. Similarly, only 20 data points are presented for the clarity of the figures. Compared with the results shown in FIGS. 7, 8 and 9, they are much worse. In the Rosenbrock function, some runs even have diverged, mainly due to the bad performance of the model prediction.

A new method for reducing fitness evaluations in evolutionary computation is proposed. In each generation, the population is clustered into a number of groups and only the individuals closest to each cluster center are evaluated. Then a neural network ensemble is constructed using the data from the evaluated individuals. To further improve the prediction quality, the weights of the ensemble are optimized using a standard ES.

An embodiment of the invention further exploit information contained in the ensemble by taking advantage of the standard deviation of the output of the ensemble members. When the ensemble members disagree significantly, the prediction error is very likely to be large and thus the ensemble prediction is replaced by the fitness value of the cluster center of the individual. Simulation results on the test functions suggest that the proposed algorithm is very promising.

Currently, the number of individuals to be controlled is fixed. As suggested in Y. Jin, M. Olhofer, and B. Sendhoff, A framework for evolutionary optimization with approximate fitness functions, IEEE Transactions on Evolutionary Computation, 6(5):481-494, 2002, which is incorporated by reference herein in its entirety, an adaptation of the control frequency could provide more performance improvement. According to an embodiment of the present invention, one possibility is to determine the number of individuals to optimize the performance of the clustering algorithm using the global silhouette width.

Aspects of an exemplary embodiment of the invention include:

The k-means clustering is used for selecting individuals for re-evaluation in the context of the individual-based evolution control.

An ensemble, instead of a single model is used to improve the prediction quality. Besides, an ES is used to optimize the weights of the ensemble on-line based on an estimated prediction error.

One of the main contributions of an embodiment of the invention is that the variance of the ensemble members is exploited to detect large prediction errors. Once such an error is detected, the prediction of the meta-model is discarded and the fitness of the concerned individual is replaced by that of the individual closest to the cluster center.

The present invention may be embodied in various forms and should not be construed as limited to the embodiments set forth herein. Rather, these embodiments are provided so that disclosure will be thorough and complete and will fully convey the invention to those skilled in the art. Further, the apparatus and methods described are not limited to rigid bodies. While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without department from the spirit and scope of the invention as it is defined in the appended claims.

What is claimed is:

1. An evolutionary optimization method for optimizing a hydrodynamic or aerodynamic design, a set of parameters for the hydrodynamic or aerodynamic design represented by individuals, the method comprising the steps of:
   (a) setting up an initial population of the individuals representing the set of parameters for the hydrodynamic or aerodynamic design and applying an original fitness function;
   (b) selecting offspring individuals having a high evaluated quality value as parents;
   (c) reproducing the parents to create a plurality of offspring individuals;
   (d) evaluating the quality of the plurality of offspring individuals by selectively using the original fitness function or an approximate fitness function for each offspring individual, the approximation function comprising a neural network ensemble including a plurality of neural networks, evaluating the quality of the plurality of offspring individuals including the steps of:
      grouping all of the plurality of offspring individuals into clusters;
      selecting for each cluster one or more offspring individuals, resulting in altogether selected offspring individuals;
      evaluating the selected offspring individuals by means of the original fitness function to generate original fitness values;
      evaluating the remaining offspring individuals by means of the approximate fitness function to generate approximate fitness values;
      determining a variance of the approximate fitness values for the remaining offspring individuals; and
      replacing the approximate fitness values of the remaining offspring individuals in a cluster with the original fitness value of the selected offspring individual closest to a center of the cluster responsive to the variance of the approximate fitness value being larger than a threshold;
   (e) repeating steps (b) through (d) until a termination condition is met; and
   (f) storing the offspring individuals representing the set of parameters for the hydrodynamic or aerodynamic design in a computer storage.

2. The method of claim 1, wherein the offspring individuals chosen for evaluation with the original fitness function are the ones closest to the cluster center.

3. The method of claim 1, wherein a k-means method is used to group all of the plurality of offspring individuals into clusters.

4. The method of claim 1, wherein an output of each neural network in the neural network ensemble is weighted and combined to a final output of the neural network ensemble.

5. The method of claim 1, wherein a genetic algorithm with a local search is used to generate the neural network ensemble.

6. The method of claim 1, wherein an evolution strategy is used to optimize weights of the neural network ensemble by minimizing an expected prediction error.

7. The method of claim 1, wherein the method is applied for the optimization of turbine rotor, stator blades, or outlet guide vanes.

8. The method of claim 1, wherein the method is applied for the optimization of aerodynamic properties of vehicles.

9. A computer software program for optimizing a hydrodynamic or aerodynamic design, a set of parameters for the hydrodynamic or aerodynamic design represented by individuals, the computer software program comprising a readable medium structured to store instructions executable by a processor, the instructions, when executed cause the processor to:
  (a) set up an initial population of individuals and applying an original fitness function;
  (b) select offspring individuals having a high evaluated quality value as parents;
  (c) reproduce the parents to create a plurality of offspring individuals;
  (d) evaluating the quality of the plurality of offspring individuals by selectively using the original fitness function or an approximate fitness function for each offspring individual, the approximation function comprising a neural network ensemble including a plurality of neural networks, evaluating the quality of the plurality of offspring individuals including the steps of:
    grouping all of the plurality of offspring individuals into clusters;
    selecting for each cluster one or more offspring individuals, resulting in altogether selected offspring individuals;
    evaluating the selected offspring individuals by means of the original fitness function to generate original fitness values;
    evaluating the remaining offspring individuals by means of the approximate fitness function to generate approximate fitness values;
    determining a variance of the approximate fitness values for the remaining offspring individuals; and
    replacing the approximate fitness values of the remaining offspring individuals in a cluster with the original fitness value of the selected offspring individual closest to a center of the cluster responsive to the variance of the approximate fitness value being larger than a threshold;
  (e) repeat steps (b) through (d) until a termination condition is met; and
  (f) storing the offspring individuals representing the set of parameters for the hydrodynamic or aerodynamic design in a computer storage.

* * * * *